United States Patent [19]

Kanematsu et al.

[11] Patent Number: 4,558,419

[45] Date of Patent: Dec. 10, 1985

[54] METHOD OF JUDGING AND CONTROLLING SIMULTANEOUS MACHINING IN A QUADRIAXIAL NUMERICAL CONTROL LATHE

[75] Inventors: Hiroyuki Kanematsu, Konan; Akimitsu Nagae, Kasugai; Shinji Sano, Konan, all of Japan

[73] Assignee: Yamazaki Machinery Works, Ltd., Japan

[21] Appl. No.: 472,252

[22] Filed: Mar. 4, 1983

[30] Foreign Application Priority Data

Mar. 11, 1982 [JP] Japan .................................. 57-39211

[51] Int. Cl.[4] ............................................. G06F 15/46
[52] U.S. Cl. .................................... 364/474; 364/475; 364/172; 318/568; 318/569
[58] Field of Search ................ 364/474, 475, 172, 175; 318/567, 568, 569, 625; 82/26

[56] References Cited

U.S. PATENT DOCUMENTS 4,092,720 5/1978 Carey .................................... 364/474
4,424,569 1/1984 Imazeki et al. ...................... 364/468

FOREIGN PATENT DOCUMENTS 1567762 5/1980 United Kingdom .
0503211 4/1976 U.S.S.R. ............................... 318/569
0579598 11/1977 U.S.S.R. ............................... 318/625

Primary Examiner—Jerry Smith
Assistant Examiner—Louis Woo
Attorney, Agent, or Firm—Cushman, Darby and Cushman

[57] ABSTRACT

A method of judging and controlling simultaneous machining in a quadriaxial numerical control lathe having two tool rests. A machining pattern pair memory stores a pair table showing possibility of simultaneous execution of different machining patterns. A judgement is made as to whether a simultaneous execution of two machining processes in accordance with input machining informations is possible, through a retrieval of the table in the machining pattern pair memory, and machining programs for two tool rests are formed through an automatic judging concerning the possibility of simultaneous machining to relieve the programmer from the work for making such a decision.

20 Claims, 5 Drawing Figures

Fig. 5

| | | | OUTER PERIPHERY MACHINING | | | | INNER PERIPHERY MACHINING | | | | | END SURFACE MACHINING | | |
|---|---|---|---|---|---|---|---|---|---|---|---|---|---|---|
| | | | ROUGH MACHINING | FINISH MACHINING | THREADING | GROOVING | DRILLING | ROUGH MACHINING | FINISH MACHINING | THREADING | GROOVING | ROUGH MACHINING | FINISH MACHINING | GROOVING |
| OUTER PERIPHERY MACHINING | ROUGH MACHINING | ○ | | | | | | | | | | | |
| | FINISH MACHINING | ○ | ○ | | | | | | | | | | |
| | THREADING | ○ | ○ | ○ | | | | | | | | | |
| | GROOVING | △ | ○ | ○ | ○ | | | | | | | | |
| INNER PERIPHERY MACHINING | DRILLING | ○ | ○ | ○ | △ | × | | | | | | | |
| | ROUGH MACHINING | ○ | ○ | ○ | △ | × | × | | | | | | |
| | FINISH MACHINING | ○ | ○ | ○ | ○ | × | × | × | | | | | |
| | THREADING | ○ | ○ | ○ | ○ | × | × | × | × | | | | |
| | GROOVING | ○ | ○ | △ | △ | × | × | × | × | × | | | |
| END SURFACE MACHINING | ROUGH MACHINING | ○ | ○ | △ | ○ | △ | △ | △ | ○ | △ | △ | | |
| | FINISH MACHINING | ○ | ○ | ○ | ○ | ○ | ○ | ○ | ○ | ○ | ○ | ○ | |
| | GROOVING | ○ | ○ | △ | ○ | △ | △ | △ | ○ | △ | ○ | △ | |

METHOD OF JUDGING AND CONTROLLING SIMULTANEOUS MACHINING IN A QUADRIAXIAL NUMERICAL CONTROL LATHE

BACKGROUND OF THE INVENTION

The present invention relates to a method of controlling and judging simultaneous machining performed by a quadriaxial numerical control lathe having two tool rests.

FIGS. 1 to 3 in combination illustrate how a simultaneous machining is performed by a quadriaxial numerical control lathe.

A quadriaxial numerical control lathe, having two tool rests 16,17 controllable independently, can perform a simultaneous machining of workpiece by means of the tools held by these tool rests to offer a high efficiency of the machining work. On the other hand, however, the simultaneous machining performed with this type of lathe requires a decision in the programming as to the standard of the machining performed by the tools 19 on the tool rests 16,17, in order to avoid a serious accident such as mechanical interference between the tool rests 16 and 17 or between the tools 19.

Hitherto, this decision has been made by the programmer who works out the machining program. More specifically, the programmer is obliged to minutely analyze and study the content of machining for each process to form programs for respective tool rests making a decision as to whether two kinds of the machining of the workpiece should be carried out simultaneously or the machining operations should be carried out one after the other. This programming work is extremely troublesome and requires high level of knowledge as well as experience. In addition, an amendment of the machining program for one of the tool rests is often accompanied by the necessity for an amendment of the machining program for the other tool rest. In consequence, considerable time and labor are required for the maintenance and management of the program.

SUMMARY OF THE INVENTION

Accordingly, an object of the invention is to provide a method of judging and controlling simultaneous machining in a quadriaxial numerical control lathe, improved to relieve the programmer from the troublesome work for the judgement as to whether the simultaneous machining can be made safely.

To this end, according to the invention, there is provided a method of judging and controlling simultaneous machining by quadriaxial numerical control lathe comprising: providing a machining pattern pair memory storing a table containing informations concerning possible simultaneous execution of a plurality of machining patterns which are classified according to the machining mode, and making judgement as to whether the simultaneous execution of machining processes based on the inputted machining informations is achieveable, by retrieving the table in the machining pattern pair memory.

BRIEF DESCRIPTION OF THE DRAWINGS

FIG. 5 is a schematic illustration of the content of a machining pattern pair memory.

DESCRIPTION OF THE PREFERRED EMBODIMENT

A preferred embodiment of the invention will be described hereinunder with reference to the accompanying drawings.

Figure 1:
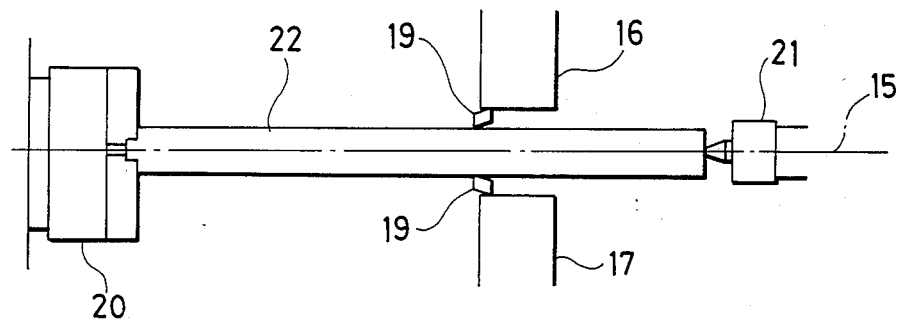
FIGS. 1 to 3 in combination illustrate how a simultaneous machining is performed in a quadriaxial numerical control lathe.
Figure 2:
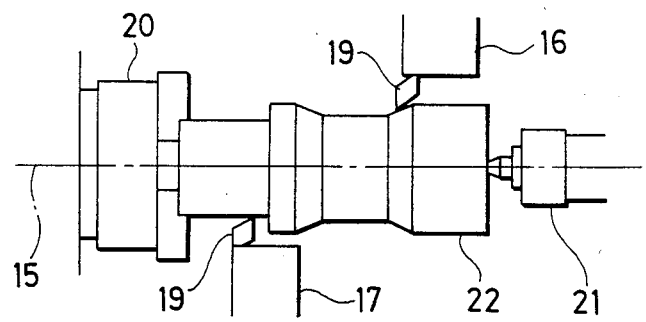
Figure 3:
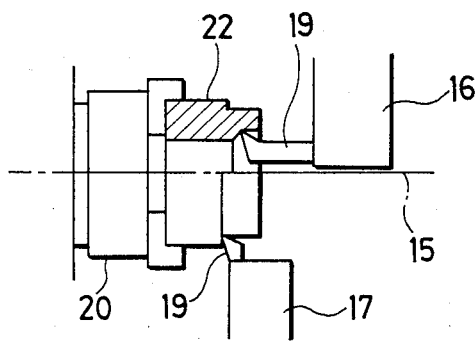
Figure 4:
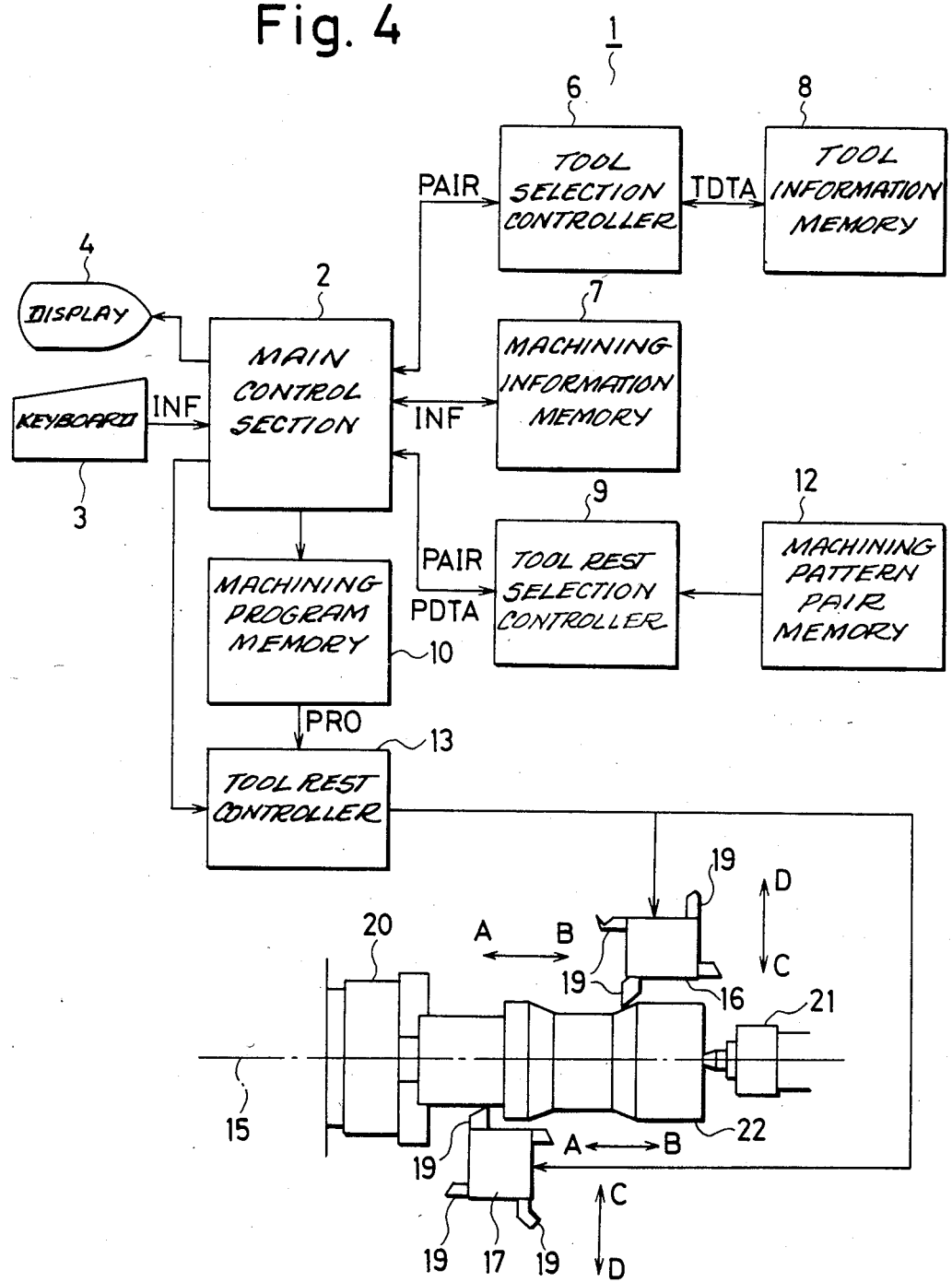
FIG. 4 is a control block diagram of a quadriaxial numerical control lathe to which the invention is applied.

As shown in FIG. 4, a quadriaxial numerical control lathe has a main control section 2 to which connected are various constituents such as a keyboard 3, display 4, tool selection controller 6, machining information memory 7, tool rest selection controller 9 and a machining program memory 10. The tool rest selection controller 9 is connected to a machining pattern pair memory 12, while the tool selection controller 6 is connected to a tool information memory 8 in which stored are various tool data DATA concerning all tools mounted on each tool rest on the lathe 1, e.g. tool mounting positions, tool shapes, tool widths, applicability of tools and so forth. The machining program memory 10 is connected to a tool rest controller 13 which in turn is connected to the main control section 2. The tool rest controller 13 is able to drive and control the tool rests 16 and 17 which are disposed to oppose to a spindle 15 and movable independently of each other in the directions shown by arrows A,B,C and D. Each of the tool rests 16 and 17 carries a plurality of tools 19. Each of the tool rests 16 and 17 is rotatable to bring the desired tool 19 into working position, i.e. to permit the selection of the tool. A work to be machined is supported between a chuck 20 and a tail stock 21.

In conducting the machining using the quadriaxial numerical control lathe 1 having the described construction, the operator successively inputs into the machining information memory 7 various machining informations INF necessary for obtaining the final shape of the work illustrated in the drawings, for each of the machining processes. The term "machining process" is used here to mean a series of machining units which are performed consecutively by the same tool. The input of the machining information INF into the machining information memory 7 is made through the main control section 2. The machining information INF carries informations such as portion of the workpiece to be machined, degree of finishing, kind of machining such as drilling, threading, grooving, and so forth, for each of the machining processes.

Meanwhile, the main control section 2 outputs the inputted machining information INF to the tool rest selection controller 9 which in turn determines the machining pattern PAT to which each of the machining processes constituting the machining information INF belongs. The tool rest selection controller 9 determines also the pair of the machining patterns executable simultaneously and pairs of the machining patterns which are not executable simultaneously.

More specifically, the machining pattern pair memory 12 stores, as shown in FIG. 5, a pair table TABL in which the machining processes are classified according to the machining portion into three modes MODE: namely, an outer periphery machining mode, inner periphery machining mode and an end surface machining mode, each mode MODE being further sorted into a plurality of machining patterns PAT such as rough machining, finish machining, threading, grooving and so forth as shown in FIG. 5. The table TABL carries also signs representing the possibility of simultaneous machining by two tool rests. For instance, two machining processes belonging to the machining pattern PAT having a mark O are simultaneously executable by two tool rests, while the machining processes belonging to the machining pattern PAT having a mark X cannot be executed simultaneously because of mutual interference between the tools. The pair of machning processes belonging to the machining pattern marked at Δ is executable simultaneously but may adversely affect the machining precision, when executed simultaneously.

Therefore, the controller 9 determines the pair PAIR of simultaneously executable machining processes in accordance with a plurality of machining informations inputted, by giving the highest preference to the pair of machining processes marked at O and then pairs marked at Δ and X in the mentioned order. Any pair PAIR of machining processes marked at O thus determined is delivered by the controller 9 to the tool selection controller 6 through the main control section 2, together with the machining information INF. Then, the controller 6 determines, through a retrieval of the tool data TDTA in the tool information memory 8, the data such as the kinds of tools necessary for execution of the machining process pair, tool rest carrying such tools and the positions of the tools on the tool rests. Such data are transferred to the controller 9 which in turn determines the tool rests for performing the machining processes constituting the pair PAIR. In the case of the pair PAIR of machining processes marked at X which cannot be executed simultaneously, a decision is made to dismiss the pair PAIR and to execute each machining process independently. Namely, the tool for each machining process is selected by the tool selection controller 6, and the tool rest carrying the selected tool is determined as the tool rest for executing each machining process. In the case of a pair PAIR of machining processes marked at Δ which are simultaneously executable but may adversely affect the machining precision, the machining modes MODE to which the machining processes in question belong, as well as the machining patterns PAT, are displayed on the display 4 through the main control section 2, thereby to enable the operator to give an instruction as to whether the machining processes should be conductd simultaneously, through the keyboard 3.

If the instruction made by the operator is to allow the simultaneous machining, an operation is made in the same manner as explained before to select the tools and tool rests. If the instruction is to prohibit the simultaneous machining, the pair PAIR is dismissed to execute the machining processes independently and separately.

The pairs PAIR of machining processes simultaneously executable and the machining processes which are not executable simultaneously are determined in the manner explained hereinbefore. Then, the main control section 2 operates to store in the machining program memory 10 the thus determined processes together with the names of tools and machining conditions in such a manner that the processes are shared by the tool rests, thereby to form a machining program PRO. As the machining program PRO is accomplished, the main control section 2 produces a signal for driving the tool rest controller 13 and for rotating the chuck 20 together with the work 22. As a result, the tool rest controller 13 reads the machining program PRO out of the memory 10, and rotates the tool rests 16 and 17 in accordance with the simultaneously executable pair PAIR instructed in the program PRO thereby to select the tools 19 appointed in the instruction. The tool rest controller 13 then drives the tool rests 16 and 17 in the directions of arrows A,B and C,D to execute the simultaneous machining, i.e. to execute the pair of machining processes. If the simultaneous machining is to be avoided, the machining is conducted by either one of the tool rests 16 and 17.

As has been described, according to the invention, the machining pattern pair memory 12 stores a pair table TABL showing the possibility of simultaneous execution of pair PAIR of machining patterns PAT classified according to the machining mode MODE, and the judgement as to whether the simultaneous execution of the machining processes is possible is made upon consulation with the table TABL. This advantageously relieves the programmer, when he works out the machining program, from the troublesome work of making decision as to whether the simultaneous machining is possible and, accordingly, the working out of the machining program is facilitated remarkably.

Furthermore, the amendment of the machining program PRO can be made simply by inputting the machining information in the amended form, because the amended machining program PRO can be formed immediately after the judgement of possibility of the simultaneous machining in the procedure explained hereinbefore. In consequence, the maintenance and management of the machining program are facilitated advantageously.

Although the invention has been described through specific terms, it is to be noted here that the described embodiment is not exclusive but only illustrative, and various changes and modifications may be imparted thereto without departing from the scope of the invention which is limited solely by the appended claims.

What is claimed is:

1. In a quadriaxial numerical control lathe having two tool rests each tool rest carrying a plurality of tools for machining a workpiece and capable of being driven independently so as to machine a workpiece either simultaneously with tools of respective tool rests or non-simultaneously, a method of controlling machining comprising the steps of:

storing in a machining pattern pair memory a pair table having data indicating which of various pairs of machining patterns, belonging to various machining modes, can be simultaneously machined;
   inputting machining information which defines pairs machining patterns which could be advantageously simultaneously carried out;
   accessing said machining pattern pair memory and determining which of the simultaneous machining patterns based upon the inputted machining information are possible;
   generating a machining program including instructions for simultaneously machining those patterns which are judged to be possible in said accessing step; and
   controlling said tool rests in accordance with said program.

2. A method according to claim 1, wherein said storing step comprises the step of organizing the data in said table into three classes including (a) pairs of machining patterns which are unconditionally executable simultaneously, (b) pairs of machining patterns which are not executable simultaneously and (c) pairs of machining patterns which are executable simultaneously but may adversely affect machining precision when executed simultaneously and wherein potential simultaneous machining patterns that are possible may include those in classes (a) and (c).

3. A method according to claim 2, wherein said storing step comprises the step of organizing the machining patterns in said table in at least three modes including (a) an outer periphery machining mode, (b) an inner periphery machining mode and (c) an end surface machining mode.

4. A method according to claim 3, wherein the machining patterns of said outer periphery machining mode are classified into at least four machining patterns including rough machining, finish machining, threading and grooving.

5. A method according to claim 3, wherein the machining patterns of said inner periphery machining mode are classified into at least five machining patterns including drilling, rough machining, finish machining, threading and grooving.

6. A method according to claim 3, wherein the machining patterns of said end surface machining mode are classified into at least three machining patterns including rough machining, finish machining and grooving.

7. A method according to claim 1, wherein said storing step comprises the step of organizing the machining patterns in said table in at least three modes including (a) an outer periphery machining mode, (b) an inner periphery machining mode and (c) an end surface machining mode.

8. A method according to claim 7, wherein the machining patterns of said outer periphery machining mode are classified into at least four machining patterns including rough machining, finish machining, threading and grooving.

9. A method according to claim 7, wherein the machining patterns of said inner periphery machining mode are classified into at least five machining patterns including drilling, rough machining, finish machining, threading and grooving.

10. A method according to claim 7, wherein the machining patterns of said end surface machining mode are classified into at least three machining patterns including rough machining, finish machining and grooving.

11. A quadriaxial numerical control lathe comprising:
at least two tool rests each tool rest carrying a plurality of tools and capable of being driven independently so that a workpiece can be machined either simultaneously or non-simultaneously by tools of respective tool rests;
a machining pattern pair memory;
means for storing in said machining pattern pair memory a pair table including data for various pairs of machining patterns, classified according to machining modes, including whether particular pairs of machining patterns can be carried out simultaneously;
means for inputting machining information specifying machining patterns to be carried out;
means for accessing said machining pattern and determining, whether pairs of machining patterns specified by said machining information could be carried out simultaneously;
means for defining a machining program in accordance with a judgment by said determining means, the program including instructions for carrying out a simultaneous machining operation if it is determined that such simultaneous machining is possible and not carrying out such simultaneous machining in the event that it is determined that a simultaneous execution of the machining process is not possible; and
means for machining in accordance with said machining program.

12. A lathe according to claim 11 wherein said data stored in said storing means includes (a) pairs of machining patterns which are executable simultaneously, (b) pairs of machining patterns which are not executable simultaneously and (c) pairs of machining patterns which are executable simultaneously but may adversely effect the machining precision when executed simultaneously.

13. A lathe according to claim 12 wherein said modes include (a) an outer periphery machining mode, (b) an inner periphery machining mode and (c) an end surface machining mode.

14. A lathe according to claim 13 wherein said outer periphery machining mode includes at least four machining patterns including rough machining, finish machining, threading and grooving.

15. A lathe according to claim 13 wherein said inner periphery machining mode includes at least five machining patterns including drilling, rough machining, finish machining, threading and grooving.

16. A lathe according to claim 13 wherein said end surface machining mode includes at least three machining patterns including rough machining, finish machining and grooving.

17. A lathe according to claim 11 wherein said modes include (a) an outer periphery machining mode, (b) an inner periphery machining mode and (c) an end surface machining mode.

18. A lathe according to claim 17 wherein said outer periphery machining mode includes at least four machining patterns including rough machining, finish machining, threading and grooving.

19. A lathe according to claim 17 wherein said inner periphery machining mode includes at least five machining patterns including drilling, rough machining, finish machining, threading and grooving.

20. A lathe according to claim 17 wherein said end surface machining mode includes at least three machining patterns including rough machining, finish machining and grooving.

* * * * *